(12) United States Patent
Bliss et al.

(10) Patent No.: US 6,731,443 B2
(45) Date of Patent: May 4, 2004

(54) TOTAL ERROR MULTIPLIER FOR OPTIMIZING READ/WRITE CHANNEL

(75) Inventors: William G. Bliss, Thornton, CO (US); James W. Rae, Rochester, MN (US)

(73) Assignee: Infineon Technologies AG, Munich (DE)

( * ) Notice: Subject to any disclaimer, the term of this patent is extended or adjusted under 35 U.S.C. 154(b) by 277 days.

(21) Appl. No.: 09/896,640

(22) Filed: Jun. 29, 2001

(65) Prior Publication Data

US 2003/0002186 A1 Jan. 2, 2003

(51) Int. Cl.$^7$ .............................. G11B 5/09
(52) U.S. Cl. ..................... 360/46; 360/51; 360/45; 360/65
(58) Field of Search .............. 710/74; 360/65, 360/45, 46, 51

(56) References Cited

U.S. PATENT DOCUMENTS

| | | | |
|---|---|---|---|
| 5,343,335 A | * 8/1994 | Hara | 360/45 |
| 5,737,342 A | 4/1998 | Ziperovich | |
| 5,768,320 A | 6/1998 | Kovacs et al. | |
| 5,784,415 A | * 7/1998 | Chevillat et al. | 360/65 |
| 5,786,951 A | * 7/1998 | Welland et al. | 360/65 |
| 5,966,258 A | 10/1999 | Bliss | |
| 6,014,768 A | 1/2000 | Lee et al. | |
| 6,091,560 A | 7/2000 | Du | |
| 6,108,152 A | 8/2000 | Du et al. | |
| 6,208,477 B1 | 3/2001 | Cloke et al. | |
| 6,208,481 B1 | 3/2001 | Spurbeck et al. | |
| 6,216,148 B1 | 4/2001 | Moran et al. | |
| 6,252,733 B1 | 6/2001 | Staszewski | |
| 6,266,210 B1 | 7/2001 | Shiroishi | |
| 6,278,568 B1 | 8/2001 | Cloke et al. | |
| 6,313,961 B1 | 11/2001 | Armstrong et al. | |
| 2001/0056511 A1 | * 12/2001 | Nemazie et al. | 710/74 |

FOREIGN PATENT DOCUMENTS

| | | | |
|---|---|---|---|
| CN | WO 00 63909 A | 10/2000 | |
| JP | 2000 235703 A | 8/2000 | |
| WO | WO 0180238 A | 10/2001 | |

OTHER PUBLICATIONS

Welland, D. et al.: "Implementation of a Digital Read/Write Channel with EEPR4 Detection", 5$^{th}$ Annual Magnetic Recording Conference (TMRC) On Signal Processing, San Diego, CA., USA, Aug. 14–17, 1994 vol. 31, No. 2, pp. 1180–1185.
International Search Report for corresponding PCT application No. PCT/US02/19089, dated Nov. 13, 2002, 8 pages.
"Synchronous Recording Channels—PRML & Beyond", rev. 5.61 14.E. 18, 1999, published by Knowledge Tek, Inc., Broomfield, Colorado.
"PRML: Seagate Uses Space Age Technology" available on the Internet at http://www.seagate.com/support/kb/disc/prml.html, 2 pages, last accessed Apr. 9, 2001.
"Technologies—PRML" available on the Internet at http://www.idema.org/about/industry.ind_tech_prml.html, 1 page, last accessed Apr. 9, 2001.
"Reference Guide—Hard Disk Drives" available on the Internet at http://www.storagereview.com/guide2000/ref/hdd, 13 pages, last accessed Apr. 9, 2001.
"MR and PRML: Technologies in Synergy" available at on the Internet at http://www.lionsgate.com/Home/Baden/public_html_index/SCSI/Quantum_White_Papers/Mr_Head/MR, 4 pages, last accessed Apr. 9, 2001.
"A Tutorial on Convolutional Coding with Viterbi Decoding" available on the Internet at http://pw1.netcom.com/~chip.f/viterbi/tutorial.html, 10 pages, last accessed Apr. 9, 2001.

* cited by examiner

*Primary Examiner*—David Hudspeth
*Assistant Examiner*—Rocio Colon
(74) *Attorney, Agent, or Firm*—Brinks Hofer Gilson & Lione

(57) ABSTRACT

A method and apparatus to optimize a bit error rate for a partial response, maximum likelihood ("PRML") read/write channel is disclosed. A channel margining circuit that is configured to carry out an embodiment for a method of optimizing the bit error rates of a read/write channel is described. The margining circuit derives an interference signal to stress a read/write channel for optimizing the bit error rate. The signal is derived from bit errors inherent with the read/write channel. The circuit reduces the time to optimize the channel by providing an amplified interference signal that increases a bit error rate during optimization.

38 Claims, 4 Drawing Sheets

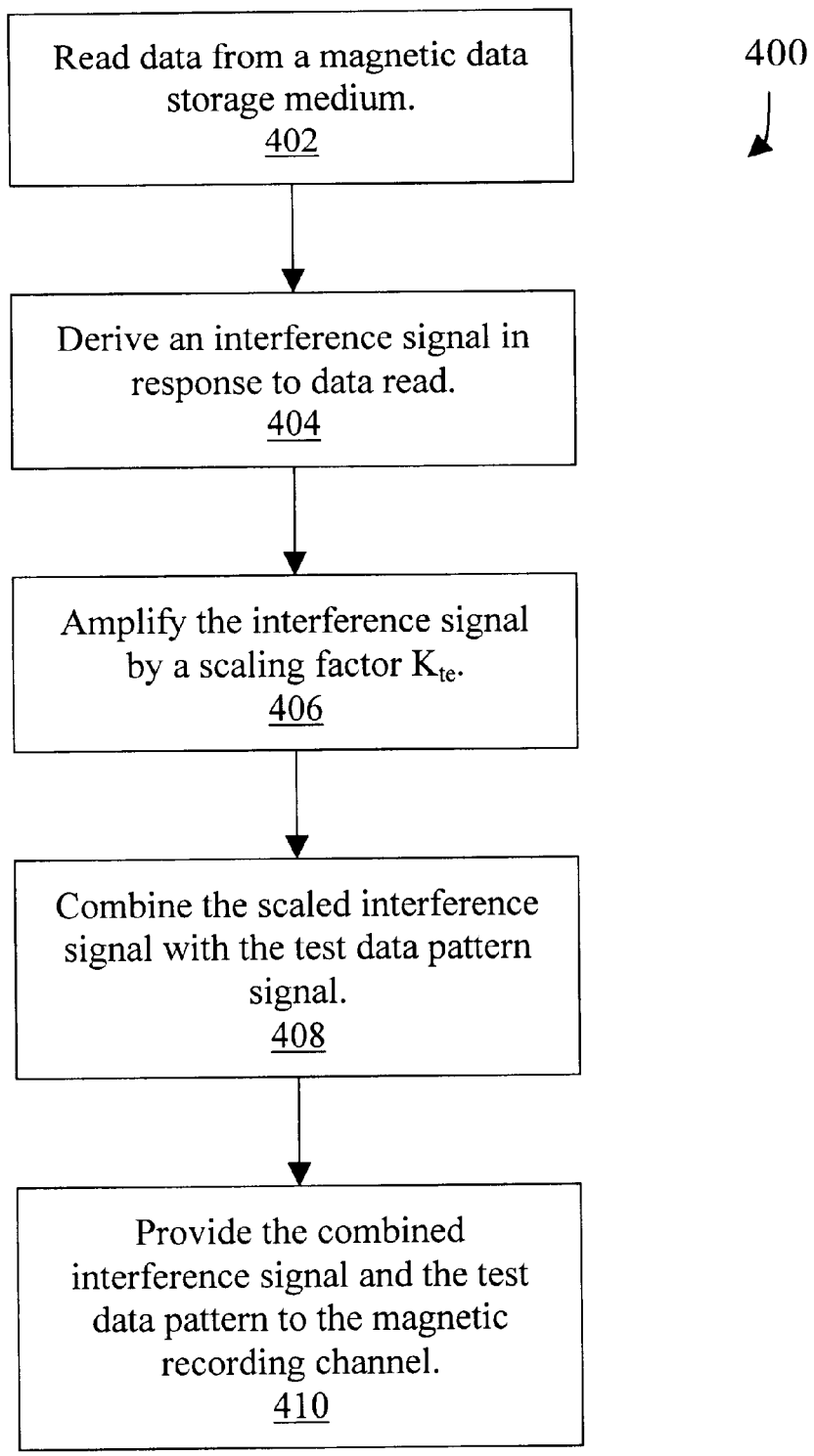

TOTAL ERROR MULTIPLIER FOR OPTIMIZING READ/WRITE CHANNEL

BACKGROUND

Computer hard disk drives, also known as fixed disk drives or hard disk drives, have become a de facto data storage standard for computer systems. Their proliferation can be directly attributed to their low cost, high storage capacity and reliability, in addition to wide availability, low power consumption, fast data transfer speeds and decreasing physical size.

Disk drives typically include one or more rotating magnetic platters encased within an environmentally controlled housing. The hard drive may have several read/write heads that interface with the magnetic platters. The disk drive may further include electronics for reading and writing data and for interfacing with other devices. The electronics are coupled with the read/write heads and include circuits to control head positioning and to generate or sense electromagnetic fields on the platters. The electronics encode data received from a host device, such as a personal computer, and translate the data into magnetic encodings, which are written onto the platters. When data is requested, the electronics locate the data, sense the magnetic encodings, and translate the encodings into binary digital information. Error checking and correction may also be applied to ensure accurate storage and retrieval of data.

The read/write heads detect and record the encoded data as areas of magnetic flux. The data are encoded by the presence or absence of a flux reversal between two contiguous areas of the platter. Data may be read using a method known as "Peak Detection" by which a voltage peak imparted in the read/write head is detected when a flux reversal passes the read/write head. However, increasing storage densities, requiring reduced peak amplitudes, better signal discrimination and higher platter rotational speeds are pushing the peaks in closer proximity. Thus, peak detection methods are becoming increasingly complex.

Advancements in read/write heads and in the methods of interpreting magnetic encodings have been made. For example, magneto-resistive ("MR") read/write heads have been designed with increased sensitivity and increased signal discrimination. In addition, technology known as Partial Response Maximum Likelihood ("PRML") has been developed. PRML disk drives function based an algorithm implemented in the disk drive electronics to read analog waveforms generated by the magnetic flux reversals. Instead of looking for peak values, PRML based drives digitally sample the analog waveform (the "Partial Response") and carry out advanced signal processing techniques to determine a most-likely bit pattern represented by the wave form (the "Maximum Likelihood"). PRML technology tolerates more noise in the magnetic signals, permitting use of lower quality platters and read/write heads, which also increases manufacturing yields and lowers costs.

With hard drives typically differentiated by factors such as cost/unit of storage, data transfer rate, power requirement, and form factor (physical dimensions), there is a need for enhanced hard drive components which prove cost effective in optimizing set-up time, storage capacity, operating speed, reliability and power efficiency. An example of an area includes PRML electronics used to calibrate and tune the PRML read/write channel to the read/write head. The process of calibrating and tuning the PRML read/write channel with the read/write head, often referred to as "channel margining," is performed when the read/write head is combined with the read/write channel. During channel margining, variable parameters of the read/write channel are adjusted to generate an optimal bit-error rate for the hard disk drive and read/write channel combination.

During channel margining, channel parameters are iteratively varied through an exhaustive matrix to determine the best bit-error rate for the read/write head and read/write channel combination. After channel margining has advanced through several stages, the hard disk drive may be operating at a bit-error rates requiring significant time to detect the bit errors. Methods used to reduce time inject artificial interference, or additive white Gaussian noise (AWGN), to the read/write channel result. These methods result in a set of channel parameters that are not optimal for low bit-error rate operation.

Accordingly, there is a need for reducing the time and resources for channel margining, while providing a low bit-error rate.

SUMMARY

A method and apparatus to optimize a bit error rate for a partial response, maximum likelihood ("PRML") read/write channel is disclosed. The magnetic recoding channel may include a channel margining circuit configured to carry out the channel margining method herein disclosed. The channel margining circuit derives an interference signal inherent with the bit error rate inherent with the bit error of the read/write channel. The interference signal may be amplified by a variable scaling factor. The variable scaling factor may be adjusted to provide artificial enhancement or degradation of a signal processed by the read/write channel. The scaled interference signal may be combined with a selected test data pattern and provided to a Viterbi detector circuit of the read/write channel. In an embodiment, the read/write channel is a partial response, maximum likelihood ("PRML") based read/write channel.

An embodiment for the channel margining circuit may include a bit pattern generator circuit, a first summing circuit, a scaling circuit, and a second summing circuit. The components of the channel margining circuit are configured to provide a variably amplified interference signal to a Viterbi detector circuit of read/write channel. The interference signal is associated with the total error of the read/write channel.

The bit pattern generator is operative to generate a digital signal having a selected pattern at a bit pattern generator output. A typical selected test pattern generated by the bit pattern generator is a parity compliant code. The selected pattern may be, for example, a pseudo random binary sequence ("PRBS") data pattern generated by linear feedback shift register ("LFSR").

The first summing circuit includes a first input, a second input, and an output. The first input may be coupled with the bit pattern generator output. The first input is configured to receive the digital signal from the bit pattern generator. The second input is configured to receive a processed binary data signal. The processed binary data signal is associated with data read from a magnetic data storage medium and processed by the read/write channel. The summing circuit is configured to generate an interference signal. The interference signal may be provided at the first summing circuit output. In an embodiment, the interference signal is associated with a difference between the digital signal provided at the first input and the processed binary data signal at the second input.

The scaling circuit includes an input that may be coupled with the first summing circuit via the first summing circuit output. The scaling circuit is configured to generate a scaled interference signal at the scaling circuit output. The scaling circuit is further configured to amplify the interference signal by a variable scaling factor. The variable scaling factor may be adjusted to provide a desired level of enhancement or degradation of a signal processed by the read/write channel.

The second summing circuit includes a first input, a second input, and an output. The first input is configured to receive the scaled interference signal from the scaling circuit output. The second input may be coupled with the bit pattern generator output. The second input is configured to receive the digital signal generated by the bit pattern generator. The second summing circuit combines the digital signal and the scaled interference signal. The combined signals are provided at the second summing circuit output, which defines an output for the channel margining circuit.

An embodiment of a method of optimizing a bit-error rate for a read/write channel includes: reading a known test data pattern signal from a magnetic data storage medium; deriving an interference signal in response to data read from the data storage medium; amplifying the interference signal by a scaling factor; combining the scaled interference signal with the test data pattern signal; and providing the combined interference signal and the test data pattern to the read/write channel.

The foregoing discussion of the summary of the invention is provided only by way of introduction. Nothing in this section should be taken as a limitation on the claims, which define the scope of the invention. Additional objects and advantages of the present invention will be set forth in the description that follows, and in part will be obvious from the description, or may be learned by practice of the present invention. The objects and advantages of the present invention may be realized and obtained by means of the instrumentalities and combinations particularly pointed out in the claims.

BRIEF DESCRIPTION OF SEVERAL VIEWS OF THE DRAWINGS

FIG. 4 is a flowchart according to an exemplary method for optimizing a bit error rate for a read/write channel.

DETAILED DESCRIPTION

The embodiments described herein relate to a partial response, maximum likelihood ("PRML") based read/write channel. The PRML read/write channel is coupled with the read/write heads of the hard drive. Herein, the phrase "coupled with" is defined to mean directly connected to or indirectly connected through one or more intermediate components. Such intermediate components may include both hardware and software based components. The read/write channel converts digital data from the host device into electrical impulses to control the read/write head to magnetically record data to the hard disk. During read operations, the read/write channel receives an analog waveform magnetically sensed by the read/write heads and converts that waveform into the digital data stored on the drive.

The illustrated embodiments provide a method and apparatus for channel margining for a read/write channel. In an embodiment, the read/write channel is a PRML based read/write channel. The PRML based read/write channel may incorporate a channel margining circuit configured to carry out an embodiment for a method for optimizing the channel margining of the read/write channel. The channel margining circuit derives an interference signal associated with errors and inaccuracies inherent with the read/write channel. The interference signal may be amplified by a variable scaling factor to reduce the time necessary to optimize a bit error rate of the read/write channel.

Figure 1:
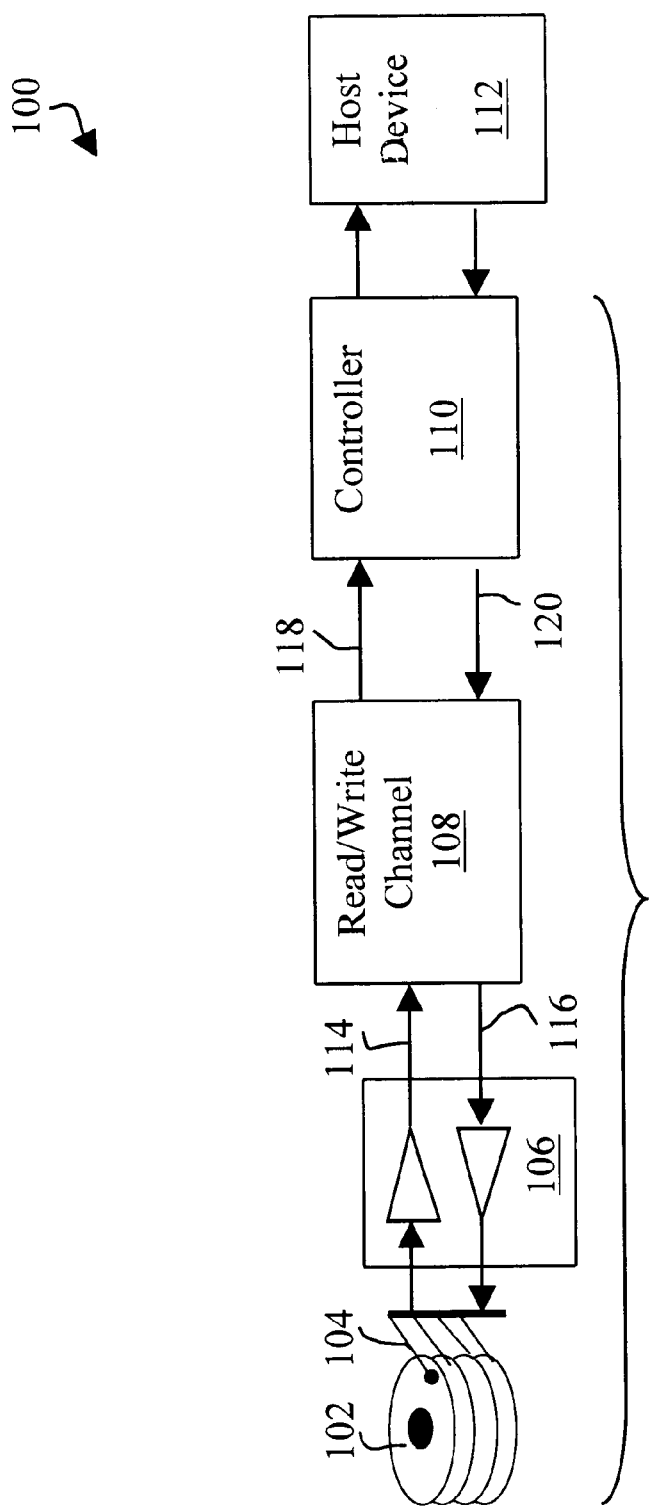
FIG. 1 depicts a block diagram of an exemplary hard drive coupled with a host device.

The present embodiments will be explained with reference to accompanied FIGS. 1 through 4. Referring now to FIG. 1, a block diagram for a hard drive 100 coupled with a host device 112 is shown. For clarity, some components, such as a servo/actuator motor control, are not shown. The drive 100 includes magnetic surfaces and spindle motor 102, the read/write heads and actuator assembly 104, pre-amplifiers 106, a read/write channel 108 and a controller 110. The pre-amplifiers 106 are coupled with the read/write channel 108 via interfaces 114 and 116. The controller 110 interfaces with the read/write channel 108 via interfaces 118 and 120.

For data read operations of the hard disk 100, the host device 112 provides a location identifier that identifies the location of the data on the disk drive, e.g. a cylinder and sector address. The controller 110 receives this address and determines the physical location of the data on the platters 102. The controller 110 then moves the read/write heads to a position proximate the location of the on the platters 102. As the data passes read/write head 104, the read/write head 104 senses the presence or absence of flux reversals, generating a stream of analog signal data. This data is passed to the pre-amplifiers 106 which amplify the signal and pass the data to the read/write channel 108 via the interface 114. As will be discussed below, the read/write channel receives the amplified analog waveform from the pre-amplifiers 106 and decodes this waveform into the digital binary data that it represents. This digital binary data is then passed to the controller 110 via the interface 118. The controller 110 interfaces the hard drive 100 with the host device 112 and may contain additional functionality, such as caching or error detection/correction functionality, intended to increase the operating speed and/or reliability of the hard drive 100.

For write operations, the host device 112 provides the controller 110 with the binary digital data to be written and the location, e.g. cylinder and sector address, of where to write the data. The controller 110 moves the read/write heads 104 to a designated location and sends the binary digital data to be written to the read/write channel 108 via interface 120. The read/write channel 108 receives the binary digital data, encodes it and generates analog signals which are used to drive the read/write head 104 to impart the proper magnetic flux reversals onto the magnetic platters 102 representing the binary digital data. The signals are passed to the pre-amplifiers 106 via interface 116 which drive the read/write heads 104.

Figure 2:
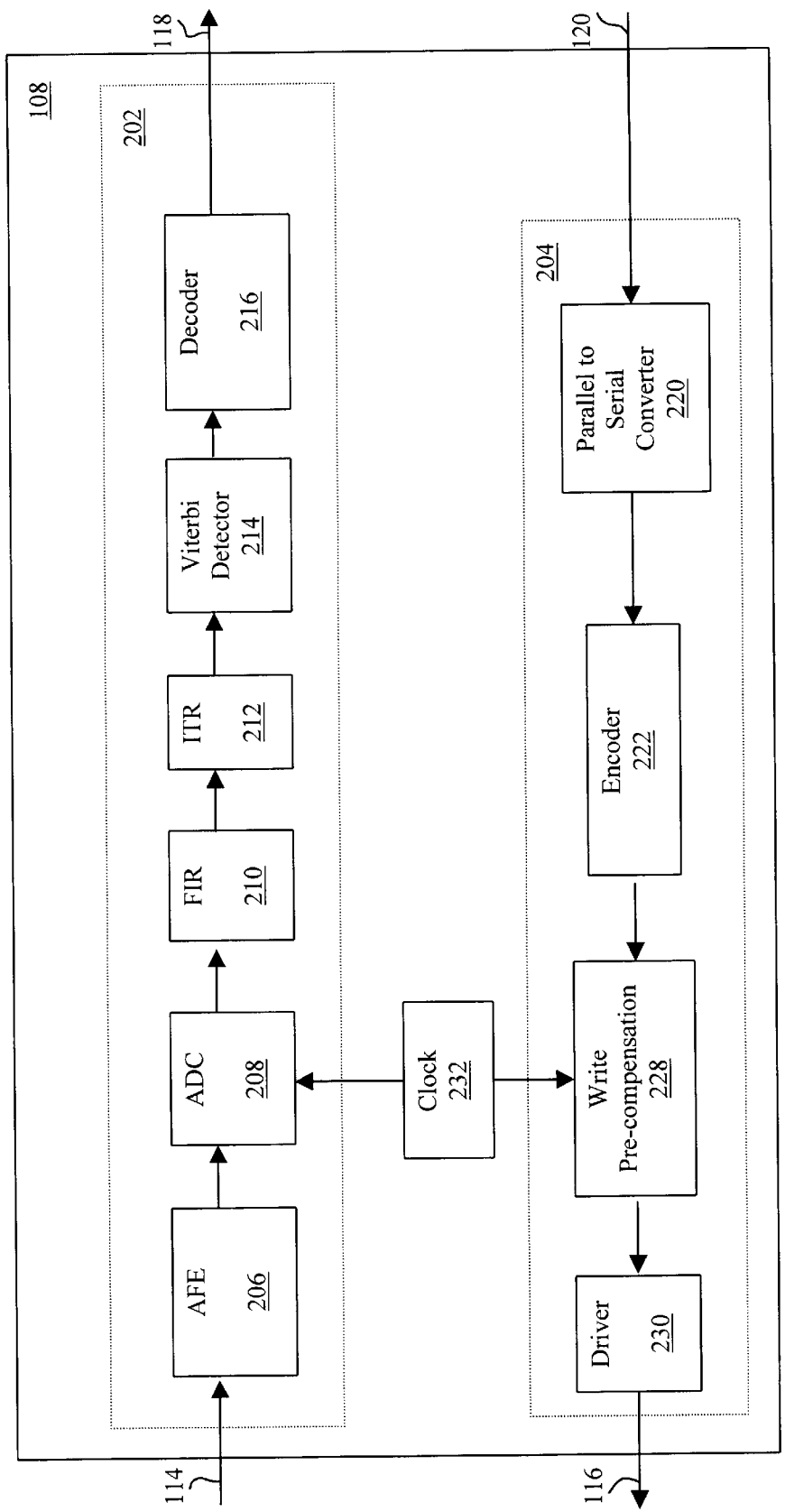
FIG. 2 depicts a block diagram of read/write channel for use with a hard drive.

Referring to FIG. 2, an exemplary read/write channel 108 is shown that supports Partial Response, Maximum Likelihood ("PRML") encoding technology for use with the hard drive 100 of FIG. 1. For clarity, some components have been omitted. The read/write channel 108 may be implemented as an integrated circuit using a complementary metal oxide semiconductor ("CMOS") process for transistors having an effective channel length of 0.18 micron. It will be appreciated that other process technologies and feature sizes may be used and that the circuitry disclosed herein may be further integrated with other circuitry comprising the hard disk electronics such as the hard disk controller logic. As was described, the read/write channel 108 converts between binary digital information and the analog signals representing the magnetic flux on the platters 102. The read/write channel 108 is divided into two main sections, the read path 202 and the write path 204.

The write path 204 includes a parallel-to-serial converter 220, an encoder 222, a write pre-compensation circuit 228, and a driver circuit 230. The parallel to serial converter 220 receives data from the host device 112 via the interface 120 eight bits at a time. The converter 220 serializes the input data and sends a serial bit stream to the RLL encoder 222. The encoder 222 encodes the serial bit stream into symbolic binary sequences according to a run-length limited ("RLL") algorithm for recording on the platters 102. The exemplary encoder may use a 32/33 bit symbol code to ensure that flux reversals are properly spaced and that long runs of data without flux reversals are not recorded. The encoder may be further configured to ensure that long runs of 0's and 1's are not recorded due to the magnetic properties of such recorded data. The signal is passed to a write pre-compensation circuit 228 that dynamically adjusts the pulse widths of the bit stream to account for magnetic distortions in the recording process. The adjusted signal is passed to a driver circuit 230 that drives the signal to the pre-amplifiers 106 via interface 116. The pre-amplifiers 106 drive the read/write heads 104 to record the data. The exemplary driver circuit 230 may include a pseudo emitter coupled logic ("PECL") driver circuit that generates a differential output to the pre-amplifiers 106.

The read path 202 includes an analog front end ("AFE") circuit 206, an analog to digital converter ("ADC") 208, a finite impulse response ("FIR") filter circuit 210, an interpolated timing recovery ("ITR") circuit 212, a Viterbi algorithm detector 214 circuit, and a decoder 216 circuit. The amplified magnetic signals sensed from the platters 102 by the read/write head 104 are received by the read/write channel 108 via interface 114. The analog waveform representing the sensed magnetic signals is first passed to the AFE circuit 206. The AFE circuit 206 processes the analog signal to clean condition the analog signal to a desired pulse amplitude and bandwidth for conversion to a digital signal. The processed analog signal is then passed to the ADC circuit 208. The ADC circuit 208 samples the analog signal and converts it to a digital signal. The ADC circuit 208 generates a time-sequenced binary signal associated with amplitude samples of the analog signal.

The digital signal is then passed to a FIR filter 210 and then to the ITR circuit 212. The FIR filter 210 is configured to equalize the frequency components of the digital signal to a desired pulse response. In an embodiment, the FIR filter 210 conditions the digital to define a pulse response for a partial response class 4 ("PR4") signal. The exemplary FIR filter 210 may be Fourier ten-tap FIR filter. The ITR 212 further conditions the digital signal to synchronize the digital signal with the analog signal processed by the AFE 206. The ITR 212 normalizes the sample timing of the digital signal to synchronize the digital signal with a bit-rate of the analog signal. In an embodiment, the ITR circuit 212 may be controlled by a phase locked loop ("PLL") to control the timing of the ITR circuit 212.

The digital signal is then passed to the Viterbi detector 214 that determines the binary bit pattern represented by the digital signal using digital signal processing techniques. The exemplary Viterbi detector 214 uses a 32 state Viterbi processor. The binary data represented by the digital signal is then passed to the parity decoder 216, which removes the parity bit, and then to the RLL decoder 218. The RLL decoder 218 decodes the binary RLL encoding symbols to the actual binary data. This data is then passed to the controller 110 via the interface 118.

The read/write channel 108 further may include a clock 232. The clock 232 provides timing signals to the read channel 224 and the write channel 204 for timing logic operations.

When the read/write channel 108 is coupled with the magnetic platters 102, the pre-amplifiers 106, and the controller 110 (FIG. 1), parameters of the read/write channel are adjusted to minimize the amount of bit errors in the signal processed by the read/write channel 108. The process may be referred to as "channel margining." During the process, a parameter of the read/write channel may be varied and a bit error rate determined. The parameter is adjusted to the value that provides an optimized bit error rate. It is desired that the bit error rate not exceed one bit error in every 10 million bits. It is more desired that the bit error rate not exceed one bit in 10 billion bits. Each parameter may be independently adjusted until each parameter is set to the value providing the optimal bit error rate. During set up of the read/write channel 108, multiple parameters may be varied to determine an optimized performance level for each parameter. For example, current read/write channels may require twelve parameters to be adjusted. When each of the twelve channels have been optimized, the process may be repeated to ensure optimal bit error rate of the read/write channel. On occasion, the process is repeated three times to ensure optimal bit error rates. Accordingly, channel margining may take several iterations of parameter adjustment before the entire channel is considered to have an optimized bit error rate. Embodiments of the channel margining circuit reduce the time to perform optimization of the read/write channel with an interference signal derived from the bit errors inherent with the read/write channel system.

Figure 3:
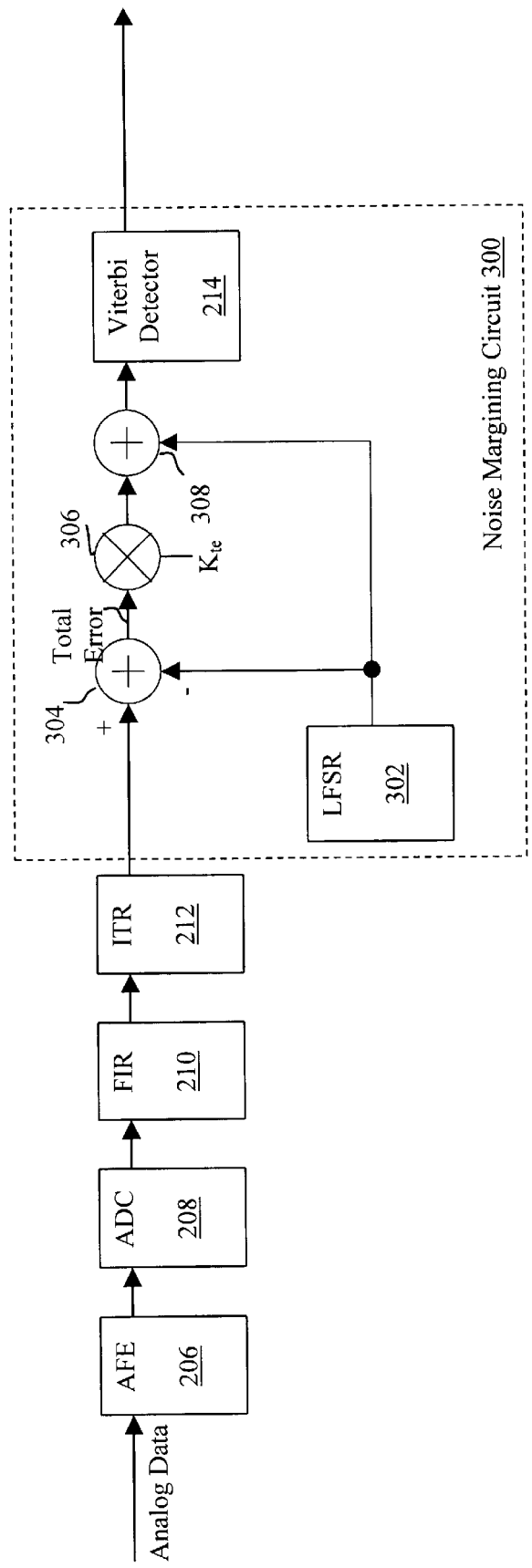
FIG. 3 is a block diagram of an exemplary read/write channel including a bit error margining circuit.

Referring now to FIG. 3, an embodiment for a portion of a read/write channel that incorporates a channel margining circuit 300 ("Margining Circuit") is shown. The portion of the read/write channel shown includes a portion of the read path 202 of FIG. 2, including the AFE circuit 206, the ADC circuit 208, the FIR circuit 210, the ITR circuit 212, and the Viterbi detector circuit 214. The portion of the read/write channel further includes the margining circuit 300 having an input coupled with an output for the ITR circuit 212 and having an output coupled with the an input for the Viterbi detector circuit 214. The channel margining circuit 300 may include a bit pattern generation circuit 302, a first summing circuit 304, a scaling circuit 306, and a second summing circuit 308.

The bit pattern generation circuit 302 generates a digital signal having a known bit pattern sequence. In an embodiment, the bit pattern generator circuit 302 is a linear feedback shift register ("LFSR"). The LFSR 302 generates a pseudo random binary sequence ("PRBS") that is parity code compliant. To optimize the bit error rate of the read/write channel, the PRBS generated by the LFSR 302 is written to the magnetic platters 102 with which the read/write channel 108 is coupled. When the signal including the PRBS is processed by the read/write channel 108, sampled amplitude errors due to flaws inherent with the magnetic platters 102 or a mistuned read write/channel 108 may be present in the signal. The LFSR 302 may be configured to provide a PRBS that is transformed according to a transfer function that estimates a correct sample value as the signal provided by ITR 212. In an embodiment, the transfer function is represented as $1-D^2$.

An interference signal associated with the total sampled amplitude errors in the read/write channel 108 and platter 102 combination can be derived by the first summing circuit 304. The first summing circuit 304 includes a first input, a second input, and an output. The first input of the first summing circuit is coupled with an output of the LFSR 302. The second input of the first summing circuit 304 defines the input for the margining circuit 300 and is coupled with an output of the ITR 212. The first summing circuit 304 subtracts the PRBS generated by the LFSR from the digital signal processed by the AFE 206, the ADC 208, the FIR 210, and the ITR 212. The signals are processed at the first summing circuit 304 such that an interference signal associated with the total bit error is generated at the output for the first summing circuit 304. In an embodiment, the first summing circuit may be implemented using synchronous digital components, including combinational logic components, latches, and multiplexers.

The scaling circuit 306 includes an input and an output. The input for the scaling circuit 306 is coupled with the output for the first summing circuit 304. The scaling circuit amplifies the interference signal associated with the total bit errors by a variable scaling factor $K_{te}$. The amplified interference signal is provided at the scaling circuit output. The scaling factor may be provided externally by a user or may be determined by the controller 110 (FIG. 1). In a present embodiment, the scaling factor may be any value ranging from zero to six and may be adjusted to artificially degrade or enhance a performance level of the read/write channel. In an embodiment, the scaling circuit 306 may be implemented using synchronous digital components, including combinational logic components, latches, and multiplexers.

The second summing circuit 308 includes a first input, a second input, and an output. The first input of the second summing circuit 308 is coupled with the output of the scaling node 306 and the second input is coupled with the output for the LFSR 302. The second summing circuit combines the scaled interference signal, associated with the total sample error, with the PRBS signal generated by the LFSR 302. The PRBS may be transformed to an estimate of the correct sample value. (e.g. $1-D^2$). The combined signal includes sample values of the PRBS written to the magnetic platters 102 and the scaled interference signal. The combined signals are provided to the Viterbi detector circuit 214 and processed by to determine the optimal performance level for the read/write channel. Because the margining circuit 300 provides an amplified interference signal derived from measured total sample error inherent in the read/write channel system 108, the bit errors will be due to a prevailing predominant noise source in the read/write channel and will have similar noise statistics. Since higher error rates may be measured more quickly than lower error rates the time to optimize the channel is reduced by providing an amplified signal that is associated with errors present in the read write channel 108. The parameters may be adjusted and errors detected more rapidly. Accordingly, the channel parameters adjusted at an artificially increased error rate will have similar characteristics to those that may be optimized at lower error rates. Because the margining circuit 300 uses errors present in the read/write channel to derive the amplified interference signal, the margining circuit 300 provides a means for stressing the read/write channel 108 that is indicative of conditions that the channel will incur in a typical operation. It is desired that the scaling factor $K_{te}$ is adjusted to a value that increases the bit-error rate to a value (10e−6) that optimizes the time required to measure bit-error rate accurately. In an embodiment, the second summing circuit may be implemented using synchronous digital components, including combinational logic components, latches, and multiplexers.

Referring to FIG. 4, a flowchart 400 for an embodiment of a method for optimizing the bit error rate for a read/write channel is shown. The method includes the acts of reading 402 a known sampled test data pattern signal from a magnetic data storage medium, deriving 404 an interference signal in response to data read from the data storage medium, amplifying 406 the interference signal by a scaling factor; combining 408 the scaled interference signal with the test data pattern signal; and providing 410 the combined interference signal and the test data pattern to the read/write channel. The act of reading 402 a known test data pattern may include processing sampled test data from the magnetic data storage medium. The act of reading 402 a known test data pattern from a magnetic data storage medium may further include writing a known test data pattern to the magnetic data storage medium. In an embodiment, the data is written using the LFSR and the bit pattern includes a parity compliant PRBS. The act of reading 402 data may include sampling data stored on the magnetic data storage medium with a read circuit portion of the read/write channel.

The act of deriving 404 an interference signal may include determining a difference between a known sample pattern and the test data sampled from the magnetic data storage medium during the act of reading 402. The interference signal is associated with the total bit error of the read/write channel.

The act of amplifying 406 includes adjusting the interference signal by a variable scaling factor $K_{te}$. The value of the scaling factor is selected to provide a desired degree of enhancement or degradation of the signal processed by the read/write channel.

During the act of combining 408 the scaled interference signal with the test data pattern, the interference signal derived from the sampled test data pattern stored by the magnetic data storage medium is combined with the a known test data pattern associated with the test data pattern read from the magnetic data storage medium. The act of providing 410 the combined signals includes providing the signal to a component of the read/write channel circuit.

Various implementations of the channel margining circuit incorporated with a read/write channel can be realized that are within the scope of the present invention. All of the components of channel margining circuit may be integrated with the read/write channel on a single integrated circuit semiconductor chip. Alternatively, some or all of the components of the counter circuit may be implemented in one or more integrated circuits external to a read/write channel.

While particular embodiments of the present invention have been shown and described, modifications may be made. It is therefore intended in the appended claims, including all equivalents, cover all such changes and modifications.

What is claimed is:

1. An integrated circuit for optimizing a bit-error rate of a read/write channel coupled with a hard disk drive, the integrated circuit comprising:

a bit pattern generator circuit operative to generate a digital signal having a selected pattern at a bit pattern generator output;

a first summing circuit having a first input, a second input, and an output, the first input being coupled with the bit pattern generator output and being operative to receive the digital signal having a selected pattern, the second input being operative to receive a processed binary data signal representing data read from a magnetic data storage medium, the summing circuit being operative to generate an interference signal at the first summing circuit output, the interference signal representing a difference between the digital signal provided at the first input and the processed binary data signal at the second input;

a scaling circuit having an input coupled with the output for the first summing circuit and operative to receive the interference signal, the scaling circuit being operative to generate a scaled interference signal at the scaling circuit output; and a second summing circuit having a first input, a second input, and an output, the first input being coupled with the scaling circuit output and operative to receive the scaled interference signal, the second input coupled with the bit pattern generator output and operative to receive the digital signal, the second summing circuit being operative to combine the digital signal and the scaled interference signal, the combined signals being provided at the second summing circuit output.

2. The integrated circuit of claim 1, wherein the magnetic data storage medium is programmed with the digital signal including the selected bit pattern.

3. The integrated circuit of claim 2, wherein the processed binary signal comprises data read from the magnetic data storage medium programmed with the selected bit pattern.

4. The integrated circuit of claim 3, wherein the processed binary signal comprises data read from the magnetic data storage medium programmed with the selected bit pattern and processed by the read/write channel.

5. The integrated circuit of claim 4, wherein the interference signal comprises a signal representative of a total error between the processed binary signal and the digital signal.

6. The integrated circuit of claim 5, wherein the bit pattern generator circuit comprises a linear feedback shift register ("LFSR").

7. The integrated circuit claim 6, wherein the scaling circuit is operative to scale the interference signal by a variable scaling factor, the scaling factor selected based on a desired error rate performance of the read/write channel.

8. The integrated circuit of claim 7, wherein the read/write channel further comprises:

an analog front end ("AFE") circuit operative to receive an analog signal associated with data read from the magnetic data storage medium and process the analog signal to a desired amplitude and bandwidth, the processed analog signal being provided at an analog front end output;

an analog-to-digital ("ADC") converter coupled with the analog front end output and being operative to convert the analog signal to a time-sequenced binary signal, the binary signal being provided at an ADC converter; and a binary signal processing circuit coupled with the ADC converter and being operative to normalize the binary signal to a desired pulse response, pulse amplitude, and sample time.

9. The integrated circuit of claim 8, wherein the binary signal processing circuit comprises:

a finite input response ("FIR") filter circuit coupled with the ADC output and being operative to equalize frequency components of the binary signal, the binary signal having equalized frequency components being provided at a FIR output; and an interpolated timing recovery ("ITR") circuit coupled with the FIR output and being operative to convert the sample time of the binary signal to a desired sample time.

10. The integrated circuit of claim 9, wherein the read/write channel comprises a partial response maximum likelihood ("PRML") read/write channel.

11. A read/write channel for use with a hard disk drive, comprising:

an analog front end ("AFE") circuit operative to process an analog signal associated with data read from a magnetic data storage medium to a desired amplitude and bandwidth, the processed analog signal being provided at an AFE output;

an analog-to-digital converter ("ADC") circuit having a first input coupled with the AFE output, the ADC operative to convert the processed analog signal at the AFE output to a time-sequenced binary signal, the binary signal being provided at an ADC output;

a digital signal processing circuit coupled with the ADC output and being operative to normalize a pulse response, an amplitude, and a sampling time of the binary signal, the normalized binary signal being provided at a digital processing circuit output;

a channel margining circuit coupled with the digital signal processing circuit output and operative to generate an optimization signal at a channel margining circuit output, the optimization signal based on a test data pattern combined with a scaled difference of the binary signal and the test data pattern; and a Viterbi detector coupled with channel margining circuit and operative to determine a data pattern of the binary signal.

12. The read/write channel of claim 11, wherein the channel margining circuit generates the optimization signal based on bit error signals inherent with the read/write channel.

13. The read/write channel of claim 12, wherein the optimization signal comprises an amplified total bit error signal associated with noise inherent with the read/write channel.

14. The read/write channel of claim 13, wherein the channel margining circuit comprises:

a bit pattern generator circuit operative to generate a digital signal having a selected pattern at a bit pattern generator output;

a first summing circuit having a first input, a second input, and an output, the first input being coupled with the bit pattern generator output and being operative to receive the digital signal, the second input being operative to receive a processed binary data signal representing data read from a magnetic data storage medium, the summing circuit being operative to generate an interference signal associated with difference between the digital signal provided at the first input and the processed binary data signal at the first summing circuit input, the interference signal provided at the output;

a scaling circuit having an input coupled with the output for the first summing circuit, the scaling circuit being operative to generate a scaled interference signal at the scaling circuit output; and a second summing circuit having a first input, a second input, and an output, the first input being coupled with the scaling circuit output and operative to receive the scaled interference signal, the second input coupled with the bit pattern generator output and operative to receive a the digital signal, the second summing circuit being operative to combine the digital signal and the scaled interference signal, the combined signals being provided at the second summing circuit output.

15. The read/write channel of claim 14, wherein the digital signal processing circuit comprises:

a finite input response ("FIR") filter circuit coupled with the ADC output and being operative to equalize frequency components of the binary signal, the binary signal having equalized frequency components being provided at a FIR output; and an interpolated timing recovery ("ITR") circuit coupled with the FIR output and being operative to convert the sample time of the binary signal to a desired sample time.

16. The read/write channel of claim 15, wherein the time-sequenced binary signal comprises amplitude time samples of the analog signal.

17. The read/write channel of claim 16, wherein the bit pattern generator circuit is operative to generate a pseudo random binary sequence.

18. The read/write channel of claim 17, wherein the bit pattern generator circuit comprises a linear feedback shift register.

19. The read/write channel of claim 18, wherein the read/write channel comprises a partial response, maximum likelihood ("PRML") read/write channel.

20. A method of optimizing a bit-error rate for a read/write channel, the method comprising the acts of:

reading a known test data pattern signal from a magnetic data storage medium;

converting the signal read from the data storage medium to a time-sequenced digital signal representative the processed test data pattern;

deriving a digital interference signal in response, the interference signal having characteristics associated with a prevailing predominant noise source in the read/write channel;

amplifying the digital interference signal by a scaling factor;

combining the scaled interference signal with the known test data pattern signal; and providing the combined interference signal and the test data pattern to the read/write channel.

21. The method of optimizing a bit-error rate of claim 20, further comprising the act of writing a known-data test pattern to the magnetic data storage medium.

22. The method of optimizing a bit-error rate of claim 21, wherein the act of writing a known-data test pattern comprises writing a psuedo random binary sequence ("PRBS") with a linear feedback shift register ("LFSR").

23. The method of optimizing a bit-error rate of claim 22, wherein the act of writing a known-data test pattern comprises writing a parity compliant PRBS to the magnetic data storage medium.

24. The method of optimizing a bit-error rate of claim 23, wherein the act of reading data from a magnetic data storage medium comprises the acts of:

receiving an analog signal associated with data stored by the magnetic medium;

processing the analog signal to comply with a desired amplitude and bandwidth;

converting the processed analog signal to a time-sequenced digital signal representative of the amplitude timed samples of the processed analog signal; and processing the digital signal to a normalized pulse response, pulse amplitude, and pulse sample-time.

25. The method of optimizing a bit-error rate of claim 24, wherein the act of processing the digital signal comprises the acts of:

equalizing frequency components of the digital signal with a finite input response ("FIR") filter circuit; and interpolating the digital signal with a interpolated timing recovery ("ITR") circuit to synchronize the digital signal with the analog signal.

26. The method of optimizing a bit-error rate of claim 25, wherein the act of equalizing frequency components comprises generating a partial response class 4 ("PR4") pulse response.

27. The method of optimizing a bit-error rate of claim 26, wherein the act of deriving the interference signal further comprises determining the difference between known data test pattern signal and the processed digital signal.

28. The method of optimizing a bit-error rate of claim 27, wherein the act of deriving a an interfering signal comprises deriving a total error signal associated with a bit error rate inherent with the read/write channel.

29. The method of optimizing a bit-error rate of claim 28, wherein the method comprises optimizing a partial response, maximum likelihood based read/write channel.

30. A hard disk drive, comprising:

a magnetic storage medium having at least one platter configured to store data as magnetic flux;

a head operative to read data from and write data to the magnetic storage medium, the head generating an analog data signal at a head output;

a partial response, maximum likelihood ("PRML") based read/write channel coupled with the head output and operative to receive and process the analog data signal generated by the head, and to convert the processed analog data signal to a time-sequenced digital signal representative of data read from the magnetic storage medium; and a channel margining circuit integrated with the PRML based read/write channel, the channel margining circuit being operative to derive an interference signal associated with a bit error rate inherent with the PRML based read/write channel, the interference signal based on a test data pattern combined with a scaled difference of the digital signal and the test data pattern.

31. The hard disk drive of claim 30, wherein the channel margining circuit is operative to amplify the interference signal by a variable scaling factor.

32. The hard disk drive of claim 31, wherein the channel margining circuit is operative to combine the amplified interference signal with a known test data pattern signal, the combined signal being provided to a Viterbi detector.

33. An margining circuit for a read/write channel, the circuit comprising:

a reading means for processing a known test data pattern signal from a magnetic data storage medium and for converting the processed test data pattern to a time-sequenced digital signal representative of the processed test data pattern;

a summing means for deriving an interference signal in response to data read from the data storage medium, the interference signal representing a difference between the known test data pattern and time-sequenced digital signal representative the processed test data pattern;

a scaling means for amplifying the interference signal by a scaling factor; and an output means for combining the scaled interference signal with the known test data pattern signal and providing the combined signals to the read/write channel.

34. The margining circuit of claim 33, further comprising a means for writing a known-data test pattern including a psuedo random binary sequence ("PRBS") to the magnetic data storage medium.

35. The margining circuit of claim 34, wherein the means for writing a known-data test pattern comprises writing a parity compliant PRBS to the magnetic data storage medium.

36. The margining circuit of claim 35, wherein the reading means comprises:

a signal input means for receiving an analog signal associated with data stored by the magnetic medium;

a signal conditioning means for processing the analog signal to comply with a desired amplitude and bandwidth;

a signal conversion means for converting the processed analog signal to the time-sequenced digital signal representative of the amplitude timed samples of the processed analog signal; and a signal normalizing means for processing the digital signal to a normalized pulse response, pulse amplitude, and pulse sample-time.

37. The margining circuit of claim 36, wherein the signal conditioning means comprises:

a filter means for equalizing frequency components; and a timing means for interpolating the digital signal to be synchronized with the analog signal.

38. The margining circuit of claim 37, wherein the read/write channel comprises a partial response, maximum likelihood based read/write channel.

* * * * *